US012124972B2

United States Patent
Gidney

(10) Patent No.: US 12,124,972 B2
(45) Date of Patent: *Oct. 22, 2024

(54) MANAGING INFORMATION FOR MODEL TRAINING USING DISTRIBUTED BLOCKCHAIN LEDGER

(71) Applicant: DocuSign International (EMEA) Limited, Dublin (IE)

(72) Inventor: Kevin Gidney, Oslow (NO)

(73) Assignee: DocuSign International (EMEA) Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,368

(22) Filed: Jul. 28, 2023

(65) Prior Publication Data

US 2023/0368050 A1    Nov. 16, 2023

Related U.S. Application Data

(63) Continuation of application No. 17/942,997, filed on Sep. 12, 2022, now Pat. No. 11,755,935, which is a
(Continued)

(51) Int. Cl.
*G06N 5/04* (2023.01)
*G06N 20/20* (2019.01)
(Continued)

(52) U.S. Cl.
CPC ............... *G06N 5/04* (2013.01); *G06N 20/20* (2019.01); *H04L 9/0637* (2013.01);
(Continued)

(58) Field of Classification Search
CPC ................... G06N 20/00–20; G06N 5/04
See application file for complete search history.

(56) References Cited

U.S. PATENT DOCUMENTS 10,095,992 B1 * 10/2018 Brestoff ................. G06F 18/214
11,468,345 B2 * 10/2022 Gidney ................. H04L 9/3297
(Continued)

FOREIGN PATENT DOCUMENTS

JP         2004295674 A    10/2004

OTHER PUBLICATIONS

Ray S., "The Difference Between Blockchains Distributed Ledger Technology" https://towardsdatascience.com/the-difference-between-blockchains-distributed-ledger-technology-42715a0fa92, Toward Data Science, Feb. 19, 2018, 12 pages.

*Primary Examiner* — Matthew T Henning
(74) *Attorney, Agent, or Firm* — KDW FIRM PLLC

(57) ABSTRACT

Embodiments are directed to generating and training a distributed machine learning model using data received from a plurality of third parties using a distributed ledger system, such as a blockchain. As each third party submits data suitable for model training, the data submissions are recorded onto the distributed ledger. By traversing the ledger, the learning platform identifies what data has been submitted and by which parties, and trains a model using the submitted data. Each party is also able to remove their data from the learning platform, which is also reflected in the distributed ledger. The distributed ledger thus maintains a record of which parties submitted data, and which parties removed their data from the learning platform, allowing for different third parties to contribute data for model training, while retaining control over their submitted data by being able to remove their data from the learning platform.

20 Claims, 7 Drawing Sheets

Related U.S. Application Data continuation of application No. 16/244,037, filed on Jan. 9, 2019, now Pat. No. 11,468,345.

(60) Provisional application No. 62/657,180, filed on Apr. 13, 2018.

(51) Int. Cl.
*H04L 9/06* (2006.01)
*H04L 9/32* (2006.01)
*H04L 9/00* (2022.01)

(52) U.S. Cl.
CPC .......... *H04L 9/0656* (2013.01); *H04L 9/3297* (2013.01); *H04L 9/50* (2022.05); *H04L 2209/08* (2013.01)

(56) References Cited

U.S. PATENT DOCUMENTS

| | | | |
|---|---|---|---|
| 11,569,981 B1* | 1/2023 | Mishra | G06F 21/64 |
| 11,755,935 B2* | 9/2023 | Gidney | G06N 3/006 |
| | | | 706/12 |
| 2018/0316502 A1* | 11/2018 | Nadeau | H04L 9/0891 |
| 2019/0287026 A1* | 9/2019 | Calmon | G06N 20/00 |

* cited by examiner

MANAGING INFORMATION FOR MODEL TRAINING USING DISTRIBUTED BLOCKCHAIN LEDGER

CROSS-REFERENCE TO RELATED APPLICATIONS

This application is a continuation of U.S. application Ser. No. 17/942,997, filed Sep. 12, 2022, which is a continuation of U.S. application Ser. No. 16/244,037, filed Jan. 9, 2019, now granted as U.S. Pat. No. 11,468,345, which claims the benefit of and priority under 35 U.S.C. § 119 to U.S. Provisional Patent Application No. 62/657,180, filed Apr. 13, 2018, which is hereby incorporated by reference in its entirety.

TECHNICAL FIELD

The disclosure generally relates to the field of information storage and management, and in particular, to the use of distributed ledgers, e.g., blockchains, to monitor and track data submitted by different parties for model training.

BACKGROUND

A contract is a document that defines legally enforceable agreements between two or more parties. Once a contract is executed, circumstances may dictate that such contract be amended or added to (addendum) one more times. The subsequently made amendments or addendums may be stored in random formats in different locations.

Frequent changes to contracts often present challenges to conventional approaches for finding changed terms in the contracts, amendments, and/or addendums. Often this is because conventional approaches typically focus on the unstructured text only and are unable to extract relevant and important information correctly. For example, a contract and amendments may include the clauses that contain wording such as "net 30 days," "within 30 days," "30 day's notice," and "2% penalty." On the other hand, one of the amendments may include the non-standard clauses such as "5 working days" with "60% penalty."

Without the ability to discover the clauses and types of the clauses accounting for their semantic variations, any party not keeping track of the amendments and/or the addendums is vulnerable to a significant amount of risk. This risk may involve overlooking or missing potentially material contractual terminologies.

Models may be used to automatically analyze a contract document in order to identify particular types of clauses. Models may be generated using machine learning, based on a training set of clause examples. In order for the model to learn effectively, it should have access to as much disparate data as possible. However, different parties with access to disparate sets of data may be hesitant to allow their data to be used for training models that may be used by other parties.

SUMMARY

Embodiments are directed to generating and training a distributed machine learning model using data received from a plurality of third parties using a distributed ledger system, such as a blockchain. As each third party submits data suitable for model training, the data submissions are recorded onto the distributed ledger. By traversing the ledger, the learning platform identifies what data has been submitted and by which parties, and trains a model using the submitted data. Each party is also able to remove their data from the learning platform, which is also reflected in the distributed ledger. The distributed ledger thus maintains a record of which parties submitted data, and which parties removed their data from the learning platform, allowing for different third parties to contribute data for model training, while retaining control over their submitted data by being able to remove their data from the learning platform.

In some embodiments, a computer implemented method for training a distributed machine learning model. The method comprises receiving data from each of a plurality of parties, and storing the received data on a file system. The method further comprises recording on a distributed blockchain ledger one or more records, wherein a first record of the one or more records comprises a hash corresponding to a pointer to at least a portion of the received data on the file system corresponding to data received from a first party of the plurality of parties, an identifier corresponding to the first party, and a timestamp indicating a time at which the record was recorded on the blockchain ledger. The method further identifies a set of data to be used for training the distributed machine learning model by traversing the one or more records of the distributed blockchain ledger and identifying the data from the plurality of parties stored on the file system using hashes of the traversed records, and trains the distributed machine learning model using the identified set of data.

In some embodiments, parties that submitted data for model training are able to, at a later time, request for their data to be removed from the learning platform. For example, the learning platform may receive a request from the first party of the plurality of parties to delete data on the file system previously received from the first party, and, in response, delete the requested data from the file system. In addition, the learning platform records on the distributed blockchain ledger at least one record comprising a hash corresponding to the deleted data, an identifier corresponding to the first party, and a timestamp indicating a time at which the record was recorded on the blockchain ledger. The learning platform may then train an updated distributed machine-learning model based upon the remaining data on the file system.

In some embodiments, each party, instead of submitting data for training a model, submits a model trained on its own data. The learning platform may use the received models to train an ensemble model on a more diverse set of data without needing to access potentially-sensitive data owned by each party. In some embodiments, a method for training an ensemble machine-learning model is provided. The method comprises receiving, from each of a plurality of parties, a machine-trained model, wherein the machine-trained model received from a first party of the plurality of parties is trained based upon a set of data corresponding to the first party. The method further comprises storing the received models on a file system, and recording on a distributed blockchain ledger one or more records. A first record of the one or more records comprises a hash corresponding to a pointer to a first model stored on the file system corresponding to the first party, an identifier corresponding to the first party, and a timestamp indicating a time at which the record was recorded on the blockchain ledger. The method further comprises identifying a set of models to be used for training the ensemble machine learning model by traversing the one or more records of the distributed blockchain ledger and identifying models stored on the file system corresponding to hashes of the traversed records, and training the ensemble machine learning model using the identified models.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
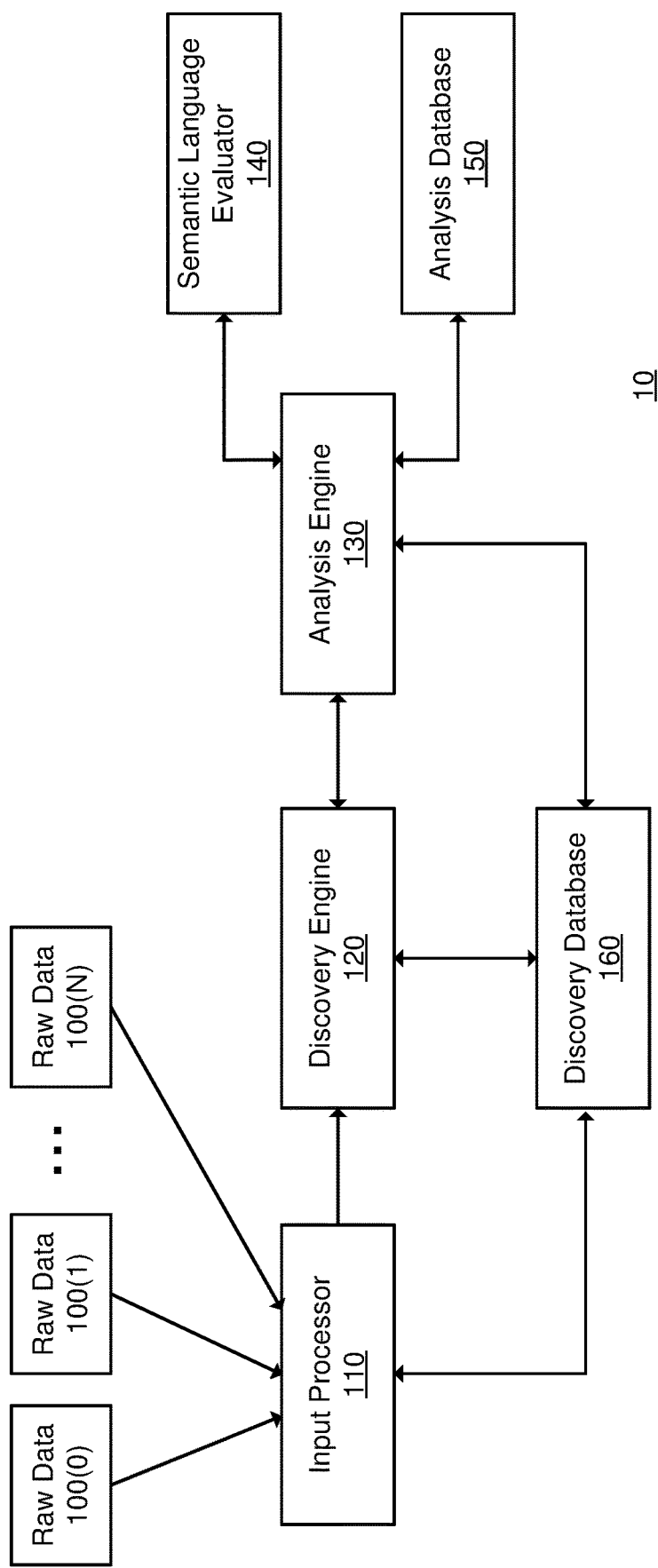
FIG. 1 illustrates one embodiment of a clause detection system for a contractual document.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Machine learning models may be used to automate a variety of functions, such as performing automatic clause detection in documents. For example, a model may be trained on training data comprising a set of clause examples, such that the model is able to, when presented with a document, identifying particular types of clauses present in the document. This may allow for the provisions of a contract document to be easily identified and tracked, even as additional amendments and addendums are added in the contract.

Data usable for model training may be owned by a plurality of parties. Each party may correspond to a customer or client of a learning platform for generating and training models, and may have access to a different set of data usable for training a model. For example, each party may have access to a plurality of contracts containing identified clause examples that can be used by the learning platform for generating and training the model.

With the introduction of new regulations such as GDPR (General Data Protection Regulation), it may become difficult to train models and artificial intelligence (AI) because of the security concerns with information breaches. It is noted that although reference herein may be made to GDPR, the principles disclosed can apply to other laws and scenarios in which training models are trained but the underlying data must be kept secure and removable by the party that submitted the data, and/or may not be otherwise disclosed. Parties are often only willing to submit information for model generation and training if it can be ensured that their data can be tracked and known at all times, and not exposed to third parties without expressed permission. In addition, each party may need to have the ability to issue a destruction request to remove their data from the system and model, in conformance with right to be forgotten regulations. As such, a system cannot use the data within the training of models unless it can be controlled, tracked, destroyed and obfuscated for personal information or elements.

However, if each party is only able to train a model on information that they have access to and can effectively track and, if required, revoke access to or destroy, the generated model may be over fitted to a small subset of information, limiting the benefits of the automation of information detection. This presents a difficult problem for the training of models for the detection of the widest possible information within the same category.

In order to effectively train a model, the learning platform should have access to as much disparate data as possible. This may be accomplished by using information from many different parties to train the model. For example, different parties may have access to information (e.g., clauses) from different verticals and industries that detail the same concept or category, for example indemnity or assignment language, that collectively may form a large set of disparate data that can be used by the system for training the model for classifying the concept or category. By training the model on different sets of data received from different parties, a more comprehensive model can be generated in comparison to models only trained on data from a single party. In some embodiments, the model may be referred to as a "distributed model" due to being trained using a distributed set of data.

In some embodiments, a system and method is provided allowing parties to provide information into a swarm learning method, in order to allow for different parties to submit data to a distributed file system for model training and to remove their data from the file system and model. A swarm learning method is defined as allowing each party the ability to provide a small part of the information, yet within a secure, traceable, trustable and distributed system.

Each party would use a platform to present clauses into a common shared information stream, where its own data would be marked and tracked and each company would be under full control of when and how the data is used. This would be performed via the use of a distributed ledger technology such as blockchain. Because the blockchain allows parties to share information within secure system without a single controlling entity, parties are able to enter information for training within the stream and then view its use and the models created based upon the information. Each model created is also placed into the same data stream on the blockchain ledger for each subscribing party to have access to. Should a party wish to remove its data from the system, the party may simply issue a destroy event and within under 90 days the information would be removed.

Clause Detection System Overview

FIG. 1 illustrates one exemplary embodiment of a clause detection system 10 including one or more input processors (generally an input processor 110), a discovery engine 120, an analysis engine 130, a semantic language evaluator 140, and an analysis database 150. Each of these components may be embodied as hardware, software, firmware or a combination thereof. In various embodiments, engines or modules include software (or firmware) structured to operate with processing components of a computing system to form a machine that operates as described herein for the corresponding engines or modules. Further, two or more engines may interoperate to form a machine that operates as described herein. Examples of the processing components of the computing system are described with respect to FIG. 8. The system 10 also comprises a discovery database 160 to store data for identifying standard exact clauses and nonstandard clauses.

As illustrated in FIG. 1, the input processor 110 aggregates one or more raw data 100(0), 100(1) . . . 100(N) (generally 100) and processes them in an appropriate format. Also, the discovery engine 120 is communicatively coupled to the input processor 110. In addition, the analysis engine 130 is coupled to the discovery engine 120. The discovery engine 120 develops a predefined policy and initial search results. Additionally, the analysis engine 130 performs a semantic language analysis by applying policies to the semantic language evaluator 140, and determines the non-standard clauses, standard clauses, and standard exact clauses used in the raw data 100. Throughout the process the discovery database 160 stores the initial search results, metadata, and the predefined policy. In addition, the discovery database 160 is communicatively coupled to the input processor 110, the discovery engine 120, and the analysis engine 130. Additionally, the analysis engine 130 is coupled to the analysis database 150 and stores information for performing semantic language evaluation. In one embodiment, the discovery database 160 and the analysis database 150 can be combined into one database.

In some embodiments, the analysis engine 130 and/or semantic language evaluator 140 may implement a machine learning model for analyzing the received input data. For example, the machine learning model may be trained based upon sets of training data submitted by different parties, and used to semantically analyze and classify the received input data. In some embodiments, the model may analyze the received input data to determine the presence of certain types of clauses within the received input data. In some embodiments, the analysis engine 130 or the semantic language evaluator 140 may access the model generated and trained by a learning platform. In some embodiments, the learning platform is implemented as part of the analysis engine 130 or the semantic language evaluator 140.

Model Training Using a Distributed Ledger, e.g., Blockchain

In order for a machine learning model to be usable for analyzing received input data, the model must first be generated and trained by a learning platform. As discussed above, the data used for training the model may be received from a plurality of different parties (e.g., third parties). However, each third party may desire to be able track how its own data is used by the learning platform in a secure and transparent manner. In order to ensure that the data received from each party is marked and tracked, the submission of data from various parties may be managed by a distributed ledger, such as a blockchain.

A method of tracking use of data by the learning platform is to use a distributed ledger technology (e.g., a blockchain) to provide an infrastructure for the sharing of data (e.g., contractual clauses), where each customer presents onto the chain the clauses they are willing to share for learning purposes. Through the use of the distributed ledger, an immutable record of operations performed by the learning platform (e.g., adding data, removing data, training a model, etc.) is maintained, allowing each party of track what data it has submitted to the learning platforms, which models have been trained using its data, whether other parties have access to the model, and/or the like. This learning method uses swarm intelligence, also referred to as swarm learning, as the system learns based on the swarm of customer data points.

Figure 2:
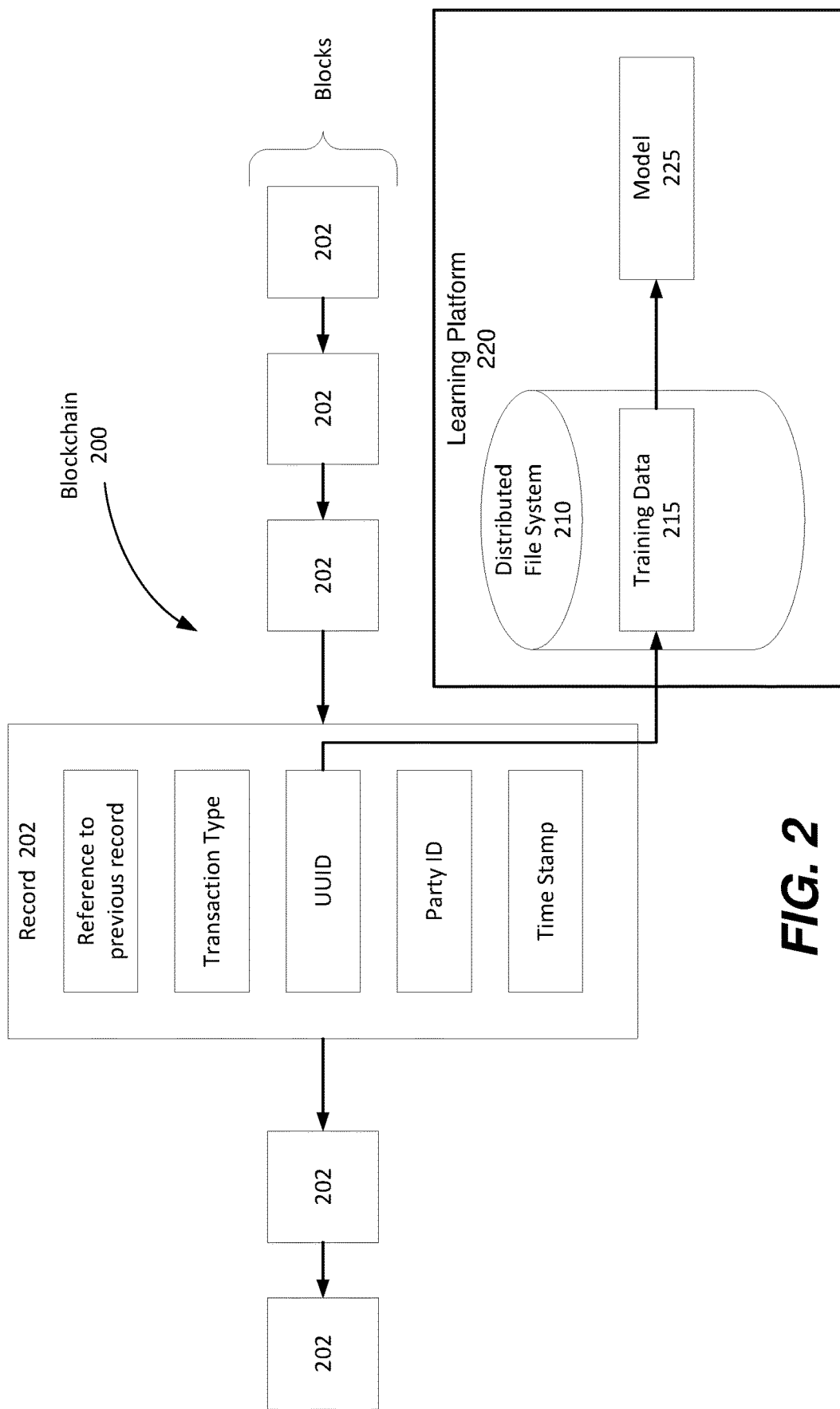
FIG. 2 illustrates a blockchain that can be used to monitor and track data submitted by various parties for model training, in accordance with some embodiments.

FIG. 2 illustrates a blockchain that can be used to monitor and track data submitted by various parties for model training, in accordance with some embodiments. A distributed file system 210 is configured to receive data suitable for training a model (e.g., clause examples) from each of a plurality of parties, which is stored as training data 215. The distributed file system 210 may be maintained by a learning platform 220, which comprises a transceiver (not shown) for receiving the training data 215, and accesses the received training data 215 (e.g., clause examples) on the distributed file system 210 in order to generate and train a model 225 (which is usable by the analysis engine 130 or semantic language evaluator 140 illustrated in FIG. 1 to identify various types of clauses in received data). In some embodiments, the distributed file system 210 may comprise an IPFS (interplanetary file system) or similar.

As discussed above, each party that submits data to form the set of training data 215 on the distributed file system 210 may need to be able to track their data, identify models trained using their submitted data, and request deletion of their data from the distributed file system 210. To do so, data stored onto the distributed file system 210 by various parties is monitored and tracked using the blockchain 200.

The blockchain 200 comprises a plurality of blocks, each corresponding to a record 202. Each record 202 corresponds to one or more actions performed on the data stored at the distributed file system 210. For example, a record 202 may correspond to a set of data added to the distributed file system 210 by a party, a request to delete data on the distributed file system 210 by a party, the training of a model 225 based on the training data 215 stored on the distributed file system 210, and/or the like.

Each record 202 of the blockchain 200 comprises a reference (e.g., a pointer) to a previous record of the blockchain 200 and an indication of a transaction type corresponding to the record 202 (e.g., data added to the file system 210, request to delete data from the file system 210, etc.). The record 202 may further comprise a universal unique ID (UUID) corresponding to the set of data (hereafter also referred to as an "item") associated with the transaction. The UUID may be usable to track and identify different transactions (e.g., corresponding to different records) concerning the item recorded in the ledger system, such as the item being added to the distributed file system 210 to be used for model training, a request to remove the item from the distributed file system 210, etc. In some embodiments, the UUID corresponds to a hash generated from the item (e.g., using a SHA2 hashing algorithm). In some embodiments, the UUID serves as a pointer to the location of the item stored on the distributed file system 210. As such, the UUID of a record 202, when decrypted, can be used to retrieve the item associated with the record 202 on distributed file system 210.

Each record 202 further comprises a party ID corresponding to a party associated with the request (e.g., the party submitting the data to the distributed file system 210, the party requesting removal of the data from the distributed file system 210, etc.). In some embodiments, the party ID may correspond to a UUID or hash ID corresponding to the party. The record 202 may further comprise a time stamp indicating a time associated with the transaction or the creation of the record 202.

In some embodiments, the learning platform 220 maintains a private key usable to determine a public key. The public key can be used to encrypt data that can only be decrypted using the private key. The learning platform 220 provides to each party contributing data for model training a public key, which is usable by the respective parties to encrypt the data to be contributed (corresponding to the records 202). Because the contributed data has been encrypted using the public key of the learning platform 220, only the learning platform 220 (being the only entity having access to its private key) is able to decrypt the contributed data using its private key.

In some embodiments, each party further provides to the blockchain 200 its own public key, such that the blockchain 200 may hold the public keys of the parties that have contributed data to the learning platform 220. The learning platform 220 can access the public keys stored on the blockchain ledger and identify the parties from which data was received for training the model. As such, once the learning platform 220 has trained the model, the learning platform 220 can issue the model to the specific parties that contributed data for model training, by encrypting the trained model with each party's public key, so that only the parties that contributed data are able to decrypt and make use of the trained model. In some embodiments, the public keys maintained by the blockchain 200 are only accessible to the learning platform 220 for training the model, and not accessible to other parties that contribute data to model training (e.g., maintained in a private stream of the blockchain accessible to the learning platform but not to other parties). In some embodiments, the public key of a party may serve as the party's party ID indicated by each record 202 of the block 200, and is generally accessible to other parties. In some embodiments, each record may also contain additional metadata regarding the submitted item, such as a number of examples within the item, allowing for the parties to traverse the blockchain 200 to identify which other parties have submitted items for use in model training and how many data examples were submitted by each party.

In some embodiments, the learning platform 220 stores the public keys of each of contributing parties (e.g., within the distributed file system 210). In some embodiments, the party ID may be based upon a reference to the public key of the party, such as a hashed pointer to location of the public key stored on the learning platform 220. In some embodiments, the party ID of the record 202 may further include metadata corresponding to the party. As such, by traversing the blockchain 200, it can be determined which parties submitted which items to the distributed file system 210. For example, by identifying all records in the blockchain 200 associated with a particular party, the learning platform 220 can identify the items submitted by that party to the distributed file system 210, using the UUIDs of the identified records pointing to the submitted items on the distributed file system 210.

In other embodiments, instead of each party encrypting data to be submitted using the public key of the learning platform 220, each party may encrypt the data using its own key, and provide to the learning platform 220 a key usable to decrypt the encrypted data submitted by the party. For example, each party may provide its key to the learning platform 220 through a private stream that can only be read by the learning platform 220. In other embodiments, each party, when submitting items to the learning platform 220, provides a party ID as part of the record 202 on the blockchain 200 that serves as a pointer to a location on the distributed file system 210 at which the party's key is stored. As the learning platform 220 traverses the blockchain 200 to determine the data to be used in training, the learning platform is able to, based upon the party ID associated with each record, identify the appropriate key to use in decrypting the data associated with the record.

In some embodiments, a different blockchain 200 is created for different types of training data (e.g., a different blockchain 200 for each information or clause type), for example clauses that are "Indemnity" clauses, which is visible to all parties within the swarm. Each party can then assign to the blockchain information from within its domain that relates to Indemnity, allowing the learning platform 220 to generate and train a distributed model for identifying and categorizing indemnity clauses based upon data submitted by a plurality of parties.

In some embodiments, different types of training data may be tracked using different streams of data within a single blockchain 200. For example, while FIG. 2 illustrates the blockchain 200 as comprising a single stream of blocks, in other embodiments, the blockchain 200 may contain multiple streams, each stream corresponding to a different logical linking of blocks. In some embodiments, a stream may allow for cross blockchain access, in that the same stream may be configured to span over two different blockchain providers, allowing access to common data. In some embodiments, a master blockchain is implemented having links to one or more other blockchains.

When an item is stored on the distributed file system 210, its UUID and descriptive information (such as the source system and company identification) are encoded onto the blockchain. The blockchain provides a logical view of items sharing common information, for example all items marked and or set as Indemnity clauses. Each record within the blockchain is only able to be decoded by the learning platform, as only the learning platform will have access to its private key. However all parties to the blockchain are able to access a timeline of information indicating items added to the learning platform and by what party, based on the party ID included in each record. This allows all parties to track which other parties have access to any model created from the submitted data, it also allows each system to see the number of members within the swarm for learning, as this is an indication of the potential accuracy of the generated models.

For example, a stream on the blockchain may maintain a record of UUIDs or hash IDs corresponding to each party. The stream may store a counter that indicates how many different parties (e.g., indicated by encryption keys associated with the records of the stream) are currently within the stream. In some embodiments, this may be done using a smart contract type code, so that when an additional party contributes data to the stream, the count is incremented. In some embodiments, each of the parties is unable the identities of other parties that have contributed data to the stream, but are able to determine the number of different parties and an indication of an amount of data contributed by each party. In addition, each party indicated as having contributed data on the stream may be automatically given access to the model trained using the distributed data provided by the plurality of parties.

Data Collection and Model Training

Because the learning platform provides a copy of its public key to each party for encrypting submitted items, once the encrypted items submitted by each of the parties has been stored on the distributed file system 210, the learning platform is able to decrypt the items using its private key, and use the data for generating and training models. For example, a model may be trained using all data available on the stream (e.g., all data not marked as deleted or being deleted). The learning platform may thus auto-generate a model based upon the available data indicated by the stream, and automatically generate needed hyper parameters for training the model. After training, the learning platform updates the blockchain with new models generated, and thus distributes the models to each party that contributed to the training data. For example, the learning platform may write a new record to the blockchain following the generation and training of a model, the record indicating that a new model has been created. The record may comprise a UUID corresponding to the model stored on the distributed file system, allowing for the model to be accessed by the contributing parties. The generated model may be encrypted using the public key of each of the contributing parties (e.g., provided as party IDs of the records 202 of the blockchain 200), such that only the contributing parties will be able to decrypt and make use of the model. As such, this form of swarm learning allows each party access to the combined benefits of the information, yet still maintain control of their submitted data items.

Figure 3:
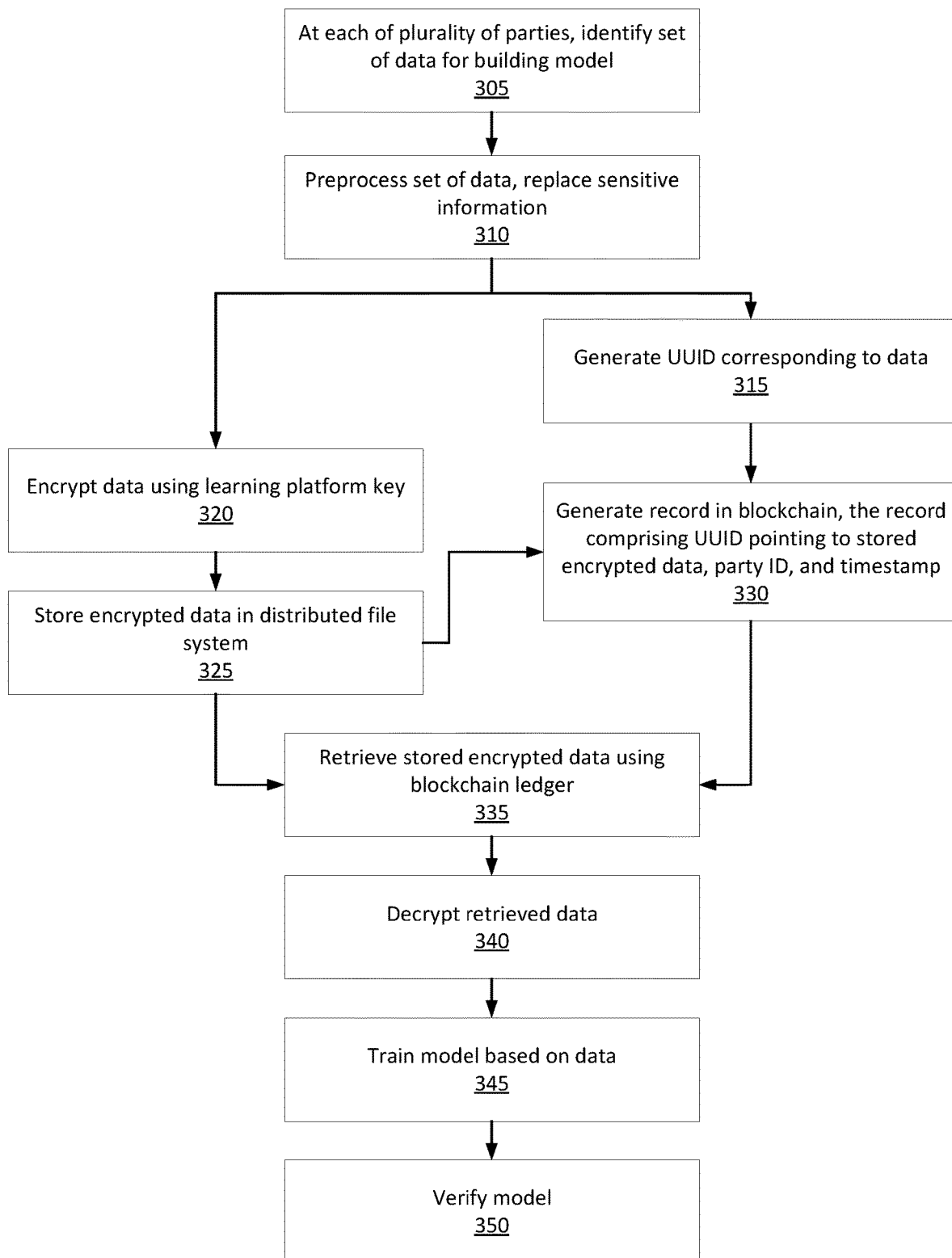
FIG. 3 illustrates a flowchart of a process for generating a model based on data submitted by a plurality of parties and managed by a blockchain, in accordance with some embodiments.

FIG. 3 illustrates a flowchart of a process for generating a model based on distributed data submitted by a plurality of third parties and managed by a blockchain, in accordance with some embodiments. At block 305, each of a plurality of parties identifies a set of data to be submitted (e.g., a data item) that is usable by the learning platform to generate and train a model. A data item may correspond to a plurality of data examples (e.g., example clauses) that are of a particular type and usable to train a classification model.

At block 310, each third party may perform preprocessing on their respective sets of data. For example, sensitive information within each set of data may be replaced or obfuscated. In some embodiments, strings within the set of data may be replaced with pseudo-random N-GRAMs, as described above. Example methods for preprocessing data items by replacing or obfuscating sensitive information is discussed in greater detail below. At block 315, a UUID is generated for each set of data (e.g., by hashing the data).

At block 320, each set of data is encrypted using the public key of the learning platform. In some embodiments, the learning platform automatically provides its public key to each of the plurality of parties. In other embodiments, a party of the plurality of parties, when submitting items of data to the learning platform, requests the learning platform's public key if it does not already have a copy. Once the data has been encrypted, then at block 325, the encrypted data is stored in the distributed file system.

At block 330, a record is generated in the blockchain comprising at least the hash or UUID of the data (e.g., generated at block 315), an indicator of the submitting party (e.g., a party ID), and a timestamp. In some embodiments, the blockchain is selected based upon a type of data. For example, where the data may correspond to a type of clause, a different blockchain may be maintained for each clause type. The UUID of the record functions as a pointer to the stored location of the data in the distributed file system. As such, by accessing the record of the blockchain, the corresponding data can be retrieved from the distributed file system.

The learning platform may use the data submitted by various parties stored at the distributed file system to generate a model. At block 335, the learning platform retrieves stored encrypted data using the blockchain. For example, the learning platform may traverse the records of the blockchain to retrieve submitted data corresponding to the traversed records, by using the UUIDs of the traversed records.

At block 340, the learning platform decrypts the retrieved data. In some embodiments, the learning platform decrypts the data using its private key (due to having been encrypted using its public key). In some embodiments, the learning platform may retrieve one or more timestamps associated with one or more blockchain records to decrypt pseudo-random data within the retrieved data. In embodiments where the received data is encrypted using keys specific to each party, the learning platform may identify the appropriate key to use for decryption based upon a party ID provided as party of the records generated by the parties when submitting items of data.

At block 345, the learning platform trains a model based on the retrieved and decrypted data. Because the model is trained on a distributed set of data received from multiple third parties, the model may be able to more accurately classify received clauses in comparison to models trained only on the data of a single third party. In some embodiments, the learning platform may further encrypt the model using the public keys of each party that submitted data for training the model (e.g., using the party IDs of the records corresponding to the data used for training to identify public keys corresponding to the submitting parties), such that only the parties that submitted data will be able to decrypt and make use of the model. At block 350, the learning platform may verify the model for use by the various parties.

Once any new model is trained, it is then also copied to the distributed file system, and a record recording the training of the model placed onto the blockchain ledger. The record may correspond to a special event that is tracked by all parties subscribing to the blockchain stream to allow them to load the new model for classifying data. However at this stage the model is only trained and automatically verified, it is not manually verified by an external party or process. This step is called the verification process and may be used to ensure that client data added to the system does not adversely and negatively affect the system operation.

In some embodiments, parties can elect to only use fully verified models, or to use early access, where early access allows for parties to use models prior to manual verification. Once the model is verified, a further record is written to the blockchain to indicate to all parties that the model has been verified and available for use. In some embodiments, the model can be automatically deployed by each of parties when the event is sensed. One method to enable this is to use a form of smart contract, where code is used to monitor the blockchain ledger for those events and changes and when seen, automatically executes for the stream and model.

Removing Model Training Data

In addition, in some embodiments, a party may, at any point, request destruction of the clauses they have loaded onto the learning platform the distributed ledger. The information may be destroyed by placing a destroy record on the ledger and then breaking the link to the encrypted files within the distributed file system. In some embodiments, to ensure this cannot be compromised, each encryption key would only have a validity of a certain period of time (e.g., 90 days), until a new key is required. The learning platform would, unless the destroy request is issued, automatically issue new updated keys for access to the training data. For example, the learning platform, at a designated time, issues a new public and private key, and provides the new public key to the parties to allow them to submit new data. In addition, the learning platform may unencrypt the existing data stored on the distributed filed system (using its previous private key), and re-encrypt the data using its new public key, such that the data can be decrypted using its new private key.

Once a key expires, it is marked as invalid and cannot be used to decrypt new data. For example, if a public key of the learning platform is expired, a party in possession of the key cannot use it to decrypt and access models trained at the learning platform, until the learning platform issues the party a new, valid key. The learning platform may periodically (e.g., every 90 days) auto-update its public key with a new valid-until date, which may be written to the stream accessible by the parties. The updated public key may be written by the learning platform to a private stream maintained by the blockchain that is accessible to each of the parties. For example, each party has access to read key information information from the private stream but cannot write to the stream, while the learning platform can write to the stream but does not read from the stream. In other embodiments, the learning platform may transmit the updated public key to each party directly. In some embodiments, data encrypted by the updated key having an updated valid-until date can still be decrypted by the same private key, such that the data submitted by the parties does not need to be decrypted and re-encrypted by the learning platform because the private key used by the learning platform does not change.

In addition, in some embodiments, each submitting party may update its keys periodically. The updated public key valid-until date is written by the party to a second private stream accessible by smart contract learning of the learning platform, where each party has access to write key information to the private stream but cannot read from the stream, while the learning platform reads from the stream but does not write to the stream.

In embodiments where each party encrypts submitted data using its own key, a party may disallow its data from being used for model training by not updating the validity of their key. On the other hand, if the party wishes to remove a specific subset of its data from being used, then the party may request deletion of the specific data to break the pointer link between the UUID or hash of the data in the stream and the data stored on the distributed file system (e.g., as described below).

In some embodiments, a destruction event is where a party using the swarm requests that their data be removed from all models, as regulations or legal events has caused them to require its destruction, e.g., a GDPR or Right to be Forgotten request. The learning platform actions this event and removes and destroys the requested data within the distributed file system. However, as the blockchain ledger is append only, the records of the original submission of the data remains in the blockchain. However, the UUID of those records will no longer point to valid data on the distributed file system. The destruction request is recorded in the blockchain, and then a new list of all valid UUIDs is generated for the model to be trained on. This means that a full audit trail and proof of destruction can be generated for the party.

In some embodiments, in order to ensure that model is only trained on data from parties that continues to desire that their data be usable for model training, the learning platform may automatically remove data from a particular party from the distributed file system unless a request is received from the party indicating that the data is to be kept. For example, each party may record on the blockchain a request to maintain their data on the distributed file system. The learning platform may periodically traverse the blockchain (e.g., every 90 days) and remove data from the distributed file system corresponding to parties not associated with a recorded party request.

Figure 4:
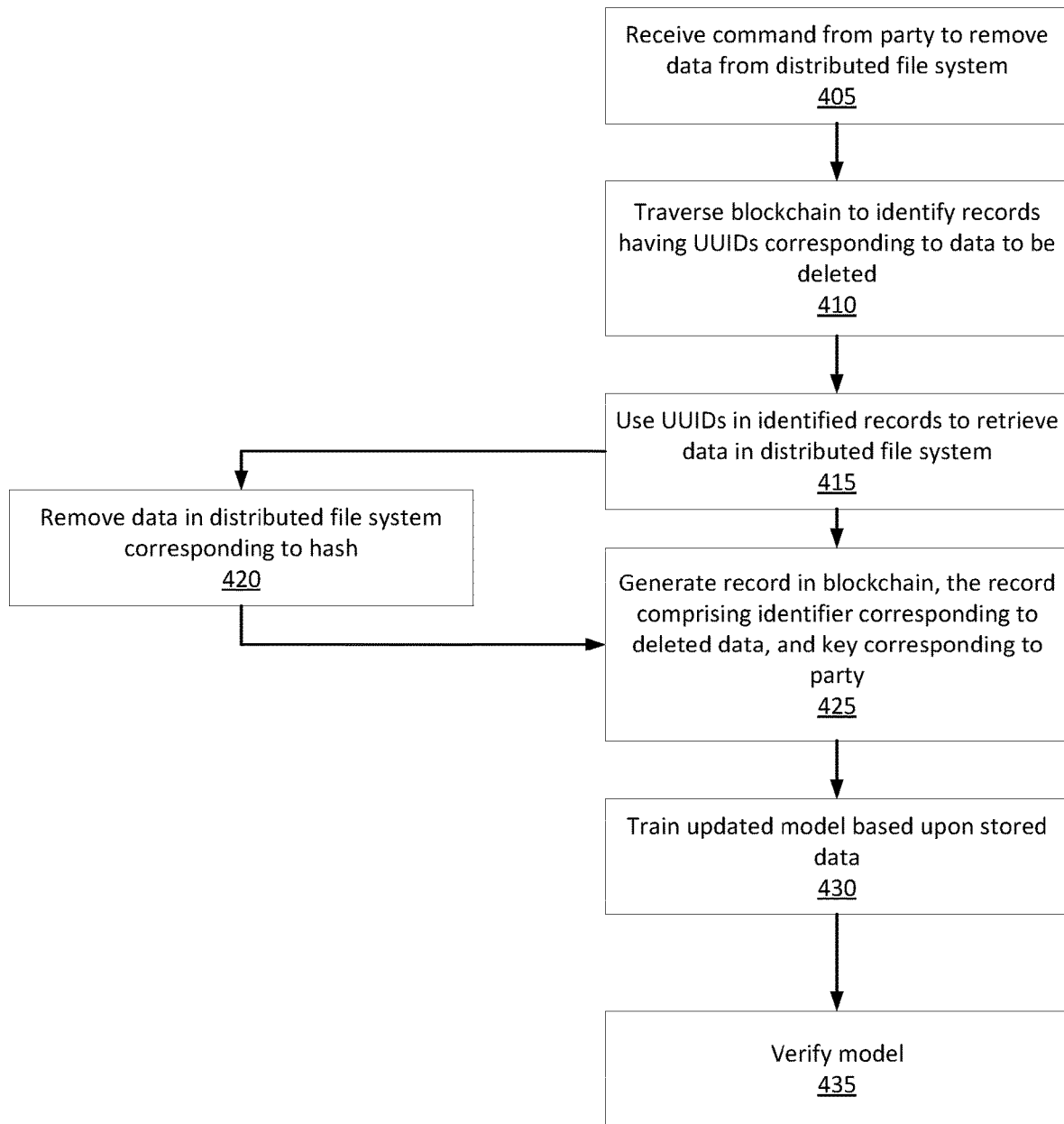
FIG. 4 illustrates a flowchart of a process for removing data submitted by a party from the distributed file system, in accordance with some embodiments.

FIG. 4 illustrates a flowchart of a process for removing data submitted by a party from the distributed file system, in accordance with some embodiments. At block 405, the learning platform receives a command from a party to remove data associated with the party from the distributed file system. The command may specify an UUID corresponding to the specific data to be removed, or may be a blanket request to remove all data associated with the party. At block 410, the learning platform, upon verifying the command, traverses the blockchain to identify records having UUIDs corresponding to the data to be deleted. In some embodiments, the identified records correspond to records in the blockchain associated with the party (e.g., determined based on the party ID contained in each record). On the other hand, in some embodiments, if the party only wishes to remove specific pieces of data from being used for model training (e.g., data corresponding to a particular UUID), the learning platform may identify the data corresponding to the command based upon a provided UUID, and does not need to traverse the blockchain.

At block 415, the UUIDs of the identified records are used to retrieve the data from the distributed file system. At block 420, the retrieved data is removed from the distributed file system.

At block 425, a record is generated in the blockchain indicating the deletion of the requested data. The record may comprise a UUID corresponding to the deleted data (e.g., a hash of the deleted data), a party ID corresponding to the party that requested the deletion, and a time stamp. Because the data has been deleted from the distributed file system, the UUID will no longer serve as a pointer to the data on the distributed file system. Instead, the UUID may be used by the learning platform to cross-reference the previously submitted data with the deleted data.

At block 430, the learning platform may train an updated model based upon the remaining data. In some embodiments, the learning platform traverses the blockchain to identify the data to be used to train the model. While the records corresponding to the addition of the now-deleted data into the distributed file system will still exist, the UUIDs of those records will no longer be pointing to stored data on the distributed file system. As such, the model will only be trained on the remaining data on distributed file system pointed to by the blockchain records. In some embodiments, the system may generate a record on the blockchain invalidating the previous version of the model. At block 435, the learning platform verifies the model for use by the parties.

By providing the above solution, the third parties are able to contribute data and benefit from an AI model trained using a more varied and distributed set of data, yet still continue to own and control the data. In addition, each of the third parties contributing data can traverse the records of the blockchain in order to view which other third parties are contributing data towards model training and/or a quantity of data being contributed by the other third parties. This allows each third party to know where the data used to train the model comes from, and how much data (e.g., number of data examples) from each of the other third parties is used by the learning platform to train each model. This may help to increase trust in the trained models, and to ensure that a bias is not being intentionally introduced in the training of the models.

Ensemble Model Process

In some embodiments, an ensemble model training process is used to allow each party to keep the training information securely within their own application, but allows for the sharing of the generated models for training an ensemble model. By sharing the generated models, a party is not giving away any information directly, instead only sharing a model that can predict on an outcome. To further ensure that the model does not contain any sensitive information, any N-GRAMs used during training may be replaced with pseudo-randomized NLP values (discussed in greater detail below). The combination of the replacement of confidential information within the N-GRAMS and NLP replacement of detected terms, allows a model to become anonymized completely.

In some embodiments, each party would present a model into a common shared information stream (e.g., distributed blockchain). Each model would be marked and tracked such that each party would be under full control of when and how the model is used. This would be performed via the use of a distributed ledger technology such as blockchain, which allows parties to share information within a secure system without a single controlling entity. Parties are able to enter information for sharing within the stream and then view its use. For example, each party may be able to determine how many other parties have contributed models to the ensemble and have access to the trained ensemble model (e.g., based upon the party IDs of the blockchain records), but may not be aware of the actual identities of the other parties. In some embodiments, each party may be associated with one or more attributes (e.g., a GEO location code), and may specify one or more restrictions that the models they provide can only be used to train ensembles assessable by parties with certain attributes (e.g., set GEO locations).

Once a party creates a local model that is trained on the party's own data, the party can make this available for inclusion within a global ensemble model generated and trained by the learning platform. Each ensemble model created is also placed into the same data stream on the blockchain ledger for each subscribing party to have access to. Should a party wish to remove its data from the system, it would simply issue a destroy event and within a predefined time period, e.g., under 90 days, the information would be removed, similar to how a party could remove its submitted data from the distributed file system as described above.

Once a model submitted by a party is encrypted (e.g., using its own key or a public key provided by the learning platform) and stored on the distributed file system, the submitted model is available to the learning platform, which identifies a key for decrypting the model (e.g., a party-specific key corresponding to the submitting party, or its own private key). Once decrypted, the model is available to use by the learning platform for training the ensemble. Once the model has been generated and trained, the learning platform updates the stream to indicate the new generated model and links to all the models used within the ensemble on the chain. The ensemble model is then distributed back to each party that contributed and other external parties that are allowed to subscribe to the swarm. For example, the learning platform may receive a public key corresponding to each party that submitted a model (e.g., as part of the data of the submitted model), and encrypt the trained ensemble model using the received public keys, such that each of the parties will be able to decrypt and access the model, while preventing access from other parties that did not submit a model for ensemble training. This form of swarm learning allows each party access to the combined benefits of the information, yet still maintain control of each data element.

In some embodiments, the training of the new ensemble model would be performed via the learning platform automatically when new data (e.g., a new model from a particular party) is added, and reviewed by experts for validity before being marked as active. In some embodiments, once any new ensemble model is trained, it is then also copied to the distributed file system, and a record placed onto the blockchain ledger. The special event is tracked by all clients subscribing to the stream to allow them to load the new ensemble model onto their respective processing platforms. However, at this stage the model is only trained and automatically verified, it is not manually verified by an external party or process. This step is called the verification process and is used to ensure that client data added to the system does not adversely and negatively affect the system operation. Parties can elect to only use fully verified ensemble models, or to use early access, where early access means they are not verified by the second process. Once the model is verified, a further record is written to the blockchain ledger to indicate to all parties that the model available for use and if selected by the party, can be automatically deployed when sensing this event. One method to enable this is to use a form of smart contract, where code is used to monitor the ledger for those events and changes and when seen, it automatically executes for the stream and ensemble model.

As described above, the learning platform is able generate and share a combined ensemble model without having to access potentially sensitive information associated with the third parties, as each third party submits a trained model instead of any data examples. Further, because each third party may obfuscate information used to generate the models (e.g., by preprocessing the training data before training each individual model), the chance for the third party to share sensitive information is further reduced.

To meet data protection and or regulatory type requirements, e.g., General Data Protection Regulation (GDPR), each third-party model is tracked and it is known exactly where the model is in use, including within the generated ensemble models and the parties using the ensemble models. The information is also protected from reverse engineering or information hacking and retrieval by the obfuscation and replacement of the national language processing (NLP), N-GRAM's and terms, thus any data breach would not result with any sensitive data being lost.

In addition, at any point a party can destroy the models they have loaded onto the learning platform using the distributed blockchain ledger, by placing a destroy record on the blockchain ledger and then breaking the link to the encrypted model files within the distributed file system (e.g., by removing the encrypted model files from the distributed file system).

In some embodiments, each party encrypts its own model using its own key, and provides to the learning platform a key usable for decrypting its model. In such cases, to ensure that the ability for a party to remove its models from the learning platform cannot be compromised, each encryption key would only have a validity for a particular length of time (e.g., 90 days), until a new key is required. The party may, unless the destroy request is issued, automatically issue new updated keys for access to the data. However, the party will stop issuing updated keys after issuing a destroy request, ensuring that even if the model data is not removed, the learning platform will no longer have a valid key for decrypting the model.

Figure 5:
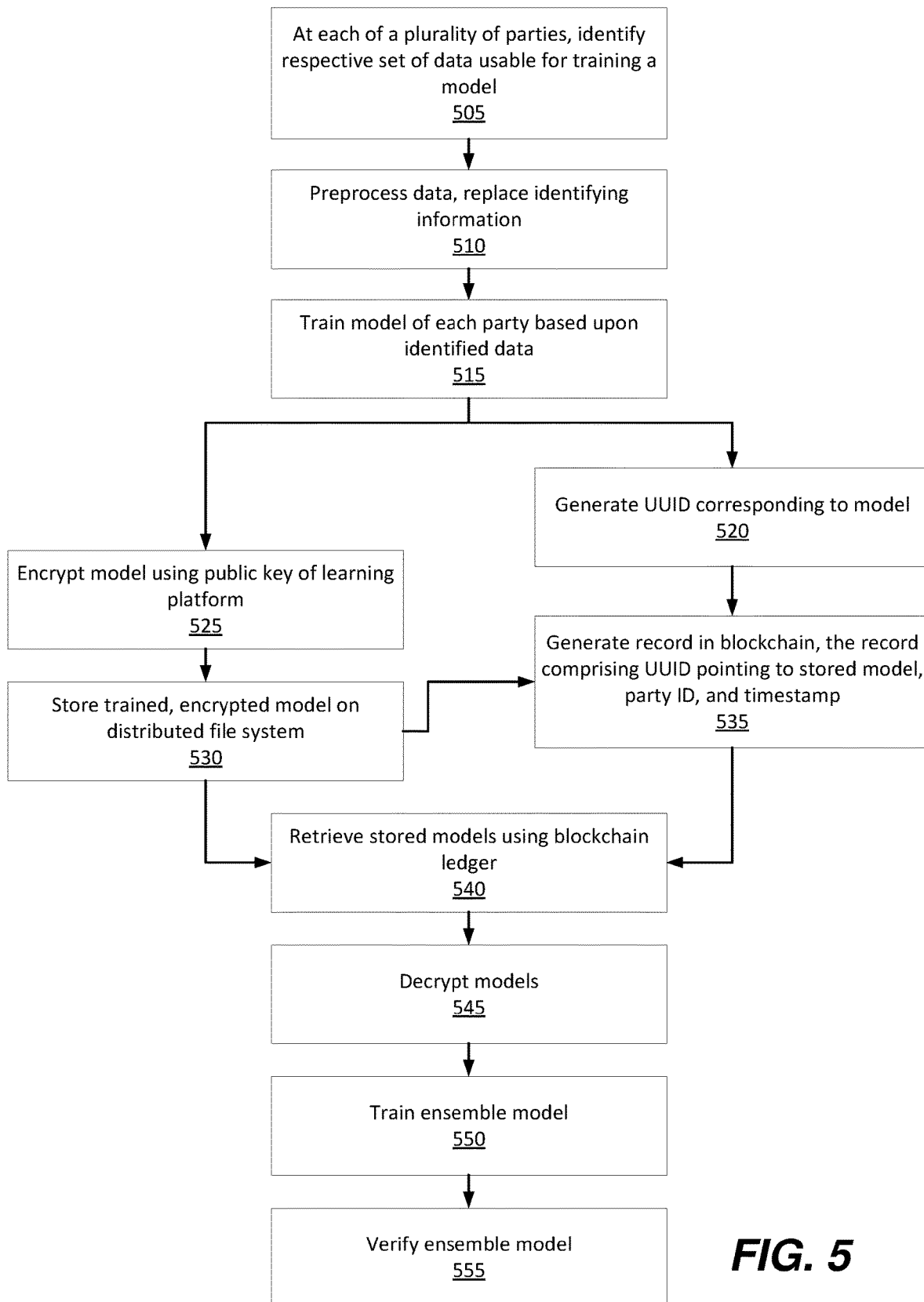
FIG. 5 illustrates a process for generating an ensemble model based upon models submitted by a plurality of parties, in accordance with some embodiments.

FIG. 5 illustrates a process for generating an ensemble model based upon models submitted by a plurality of parties, in accordance with some embodiments. At block 505, each of a plurality of parties identifies a respective set of data suitable for training a model. The data may correspond to clause examples. At block 510, each party may preprocess their respective sets of data, in order to replace and obfuscate any sensitive information within the data. At block 515, each party trains a model based upon their respective sets of data.

The party may submit the generated model for use in training an ensemble model. In order to monitor and track the use of the generated model, the submission of the generated model may be recorded on a blockchain. At block 520, each party generates a hash or UUID corresponding to their generated model. At block 525, the models corresponding to the parties are encrypted. For example, the learning platform may provide to each party a copy of its public key, which the party uses to encrypt its model, allowing for the learning party to decrypt the model using its private key. At block 530, the trained and encrypted models are stored on the distributed file system. At block 535, a blockchain record is generated, the record comprising the hash or UUID corresponding to the generated model, and a party ID corresponding to the party. The hash or UUID may function as a pointer to the encrypted model stored on the distributed file system. The blockchain record may further comprise a timestamp.

At block 540, the learning platform trains an ensemble model by retrieving the stored models received from the plurality of parties. In some embodiments, the learning platform traverses the blockchain ledger and identifies the stored models based upon the recorded UUIDs of the blockchain. At block 545, the learning platform decrypts the retrieved models. For example, the learning platform may decrypt the models using its private key, due to the models having been encrypted using the learning platform's public key provided to each of the parties. In other embodiments, the learning platform maintains keys for each party, and is able to decrypt the models once it identifies which party (and thus which key) the model is associated with (e.g., by using the party ID corresponding to the record on the blockchain ledger). At block 550, the learning platform trains the ensemble model based upon the retrieved models. In addition, the learning platform may encrypt the ensemble model using the public keys of each of the parties that submitted a model, such that each party will be able to decrypt and access the model using their respective private keys. At block 555, the learning platform verifies the trained ensemble model.

As described above, each party is able to generate a model based on their own data. However, because each party's model is trained only on their own data, the model may not have been trained on data having enough diversity. By training an ensemble model based upon the individual party models, a model that reflects a larger amount of disparate data can be trained. In addition, because each party only submits a trained model and not raw data, their own data may be kept more secure as it does not need to be submitted to the distributed file system. Each party is able traverse the blockchain to determine which parties have contributed trained models towards the training of the ensemble model. Because each party is able to determine who else has contributed models towards the training of the ensemble model, trust in the quality and reliability of the ensemble model may be increased.

Preprocessing of Training Data

In some embodiments, before a party submits an item of data to be stored in the distributed file system for model generation and training, the data may be preprocessed in order to remove any client-sensitive information that may be contained within the data. In some embodiments, any sensitive information would be replaced with NLP (natural language processing) placeholders. For example, each item may be parsed to recognize sensitive information, such as N-GRAMS (e.g., a sequence of words collectively corresponding to sensitive information), named entities (e.g., party/company/people's names), PII (personally identifiable information), monetary values and other financial information, percentages, durations of time and numbers, etc. An NLP process may be designed to detect and then replace sensitive information in each item with an NLP placeholder based upon the type of information, such as WTPerson, WTNumber, etc., in order to hide any confidential information and is a key component of an information discovery platform. This process ensures that such information is hidden and replaced with placeholders common to all parties using the system. One example of this would be replacing the party name such as Seal Software Inc., with WTOrganisation, or replacing a date such as 22 Aug. 1987 with WTDate.

In some embodiments, because N-GRAM replacements may differ significantly between customers, a method of a pseudo-random code based on the time stamp of the last record created in the blockchain may be used. This allows all parties to be in sync and use a consistent method to replace the N-GRAM's. This method would then, based on the time stamp of the record, use a randomized set of values to replace the actual text. As the records of the blockchain are persistent and will not change over time, the value of time stamp will always be known. In some embodiments, for a given time, the same words will be replaced with the same N-GRAMS across all parties.

In some embodiments, the learning platform maintains a known set of mappings that map N-GRAMS to replacement words that changes over time (e.g., periodically). As such, when an N-GRAM is detected, the N-GRAM is replaced based upon the current set of mappings. An N-GRAM may correspond a known pattern of words. For example, "xxx yyy LTD" and "aaa bbb INC" may correspond to two different tri-grams, where "xxx", "yyy", "aaa", and "bbb" correspond to variable words. The learning platform may detect a particular type of N-GRAM (e.g., "xxx yyy LTD") and replace the words of the detected N-GRAM with replacement words based upon the current mappings. As such, all N-GRAMs of a certain type may be replaced with the same replacement words at a given time (e.g., the tri-gram "xxx yyy LTD" is replaced with the same words at a given time regardless of the party submitting the information or the original words for "xxx" and "yyy"). As such, the learning platform, when generating and training a model, does not have knowledge of the actual original words of the N-GRAM, only that the training information contains an N-GRAM of a particular type. Therefore, it would be impossible for a third party, even if they were able to access the received data submitted by the party, to determine the original words of the N-GRAM, since all N-GRAMs of the same format will be replaced in the same way at a given time.

In some embodiments, the set of mappings is stored on a private stream of the blockchain that can only be accessed by the learning platform via its keys (e.g., encrypted using the public key of the learning platform). Each of the submitting parties may be able to access only a point in time of the set of mappings, in order to map identified N-GRAMs to replacement words. In some embodiments, the stream maintains the set of mappings that is randomized for use based upon a given time stamp. The resulting set of mappings is encrypted by the learning platform using the public keys of the submitting parties, and is written to a stream that can be read by each party and decrypted for use (e.g., using their respective private keys). In other embodiments, instead of a set of mappings, the learning platform may generate and maintain an algorithm configured to generate mappings based upon a current time stamp.

In some embodiments, the timing signal would use a set of values, which may run into the millions, to look up the replacement words for the N-GRAM. One example of this would be to take a company name of "Seal Software Limited." This has been recognized as a Tri-GRAM company named entity, and would be replaced based on the time and lookup data table with the random words, for example "Match Marker Solo." As the actual name of the entity is not important, only that the same replacement is done by all parties, the learning of the system will not be negatively affected. However, the security of the system will be increased as the ability of the learning platform to review sensitive or secretive information is removed.

In addition to the recognition and replacement of sensitive information in each of the items, tracking and security information may be placed onto each item. For example, each party creates a hash or UUID of the item, which is placed onto a distributed blockchain ledger based on a type of the item (e.g., clause type), as described above. The actual item of data is stored within the distributed file system and encrypted (e.g., using the learning platform's public key). At a later time, the learning platform may decrypt the item using the its private key, such that the item is made available for swarm learning and model training.

Figure 6:
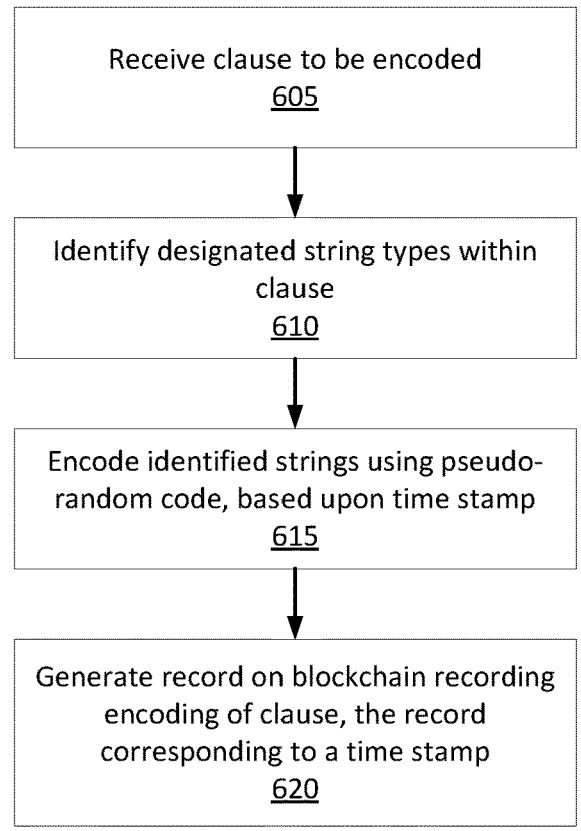
FIG. 6 illustrates a flowchart of a process for replacing portions of data items with N-GRAMs, in accordance with some embodiments.

FIG. 6 illustrates a flowchart of a process for replacing portions of data items with N-GRAMs, in accordance with some embodiments. At block 605, a clause of an item to be encoded is identified. As discussed above, an item may correspond to a set of data to be submitted by a party to the learning platforming for model training, and may comprise one or more clause examples. At block 610, a designated string type within the clause is identified. The designated string type may comprise sensitive information to be obfuscated, such as an N-GRAM, an entity name, and/or the like.

At block 615, the identified string is encoded using a pseudo-random code based upon the identified string type, based upon a time stamp. In some embodiments, the time stamp may correspond to a previously recorded record in a blockchain. Because the records of the blockchain are persistent and unchanging, the value of the time stamp will always remain constant, and as such can be used to encrypt the string and to decrypt the at a later time. In some embodiments, the pseudo-random code is determined based upon a set of mappings maintained by the learning platform and accessible to the party submitting the item. As such, at a given time, different string of the same designated string type may be obfuscated using the same pseudo-random code (e.g., all Tri-GRAM company named entities encoded at a particular time are mapped to "Match Marker Solo").

At block 620, once the string is encoded using the pseudo-random code, the item can be submitted to the distributed file system, and a new record is created on the blockchain corresponding to the submission of the item to the distributed file system. The new record may comprise a UUID or hash of the item, which serves as a pointer to the item on the distributed file system. In some embodiments, the party further encrypts the item using the public key of the learning platform, which can be decrypted by the learning platform using its private key.

Figure 7:
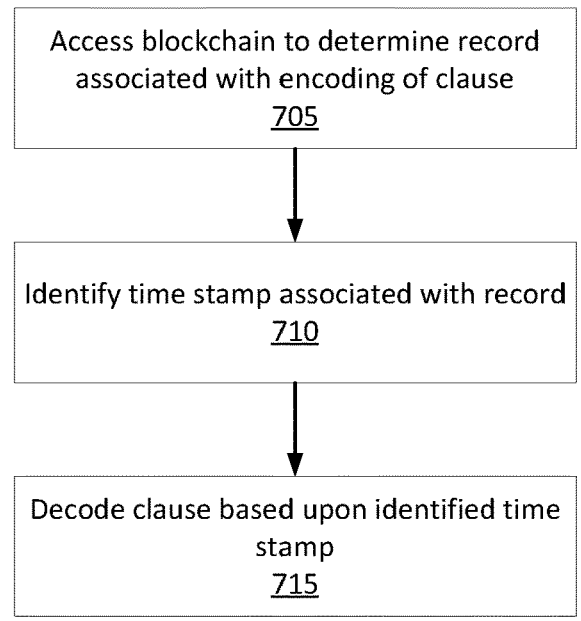
FIG. 7 illustrates a flowchart of a process for decrypting a data item, in accordance with some embodiments.

FIG. 7 illustrates a flowchart of a process for decode a data item, in accordance with some embodiments. The learning platform may decrypt a data item using its private key, but may need to further decode any pseudo-random codes present in the item to determine what type of string was present in the item. At block 705, the learning platform accesses a blockchain to determine a record associated with the encoding of the item, at least one clause of the item comprising a string replaced with pseudo-random code. In some embodiments, the record may correspond to a previous record in the blockchain. At block 710, a time stamp of the determined record is identified. At block 715, the time stamp is used to decode the pseudo-random code in the item. As such, the learning platform determines the designated string type that was within the item (e.g., determining that "Match Marker Solo" corresponds to a Tri-GRAM company named entity), allowing the item to be used for model training.

To meet GDPR requirements, each item is tracked and know exactly where in use, including within the models created and the parties using those models. In addition, because this information is also protected by the obfuscation and replacement of the NLP terms, any data breach would not result with any sensitive data being lost.

Computing Machine Architecture

Figure 8:
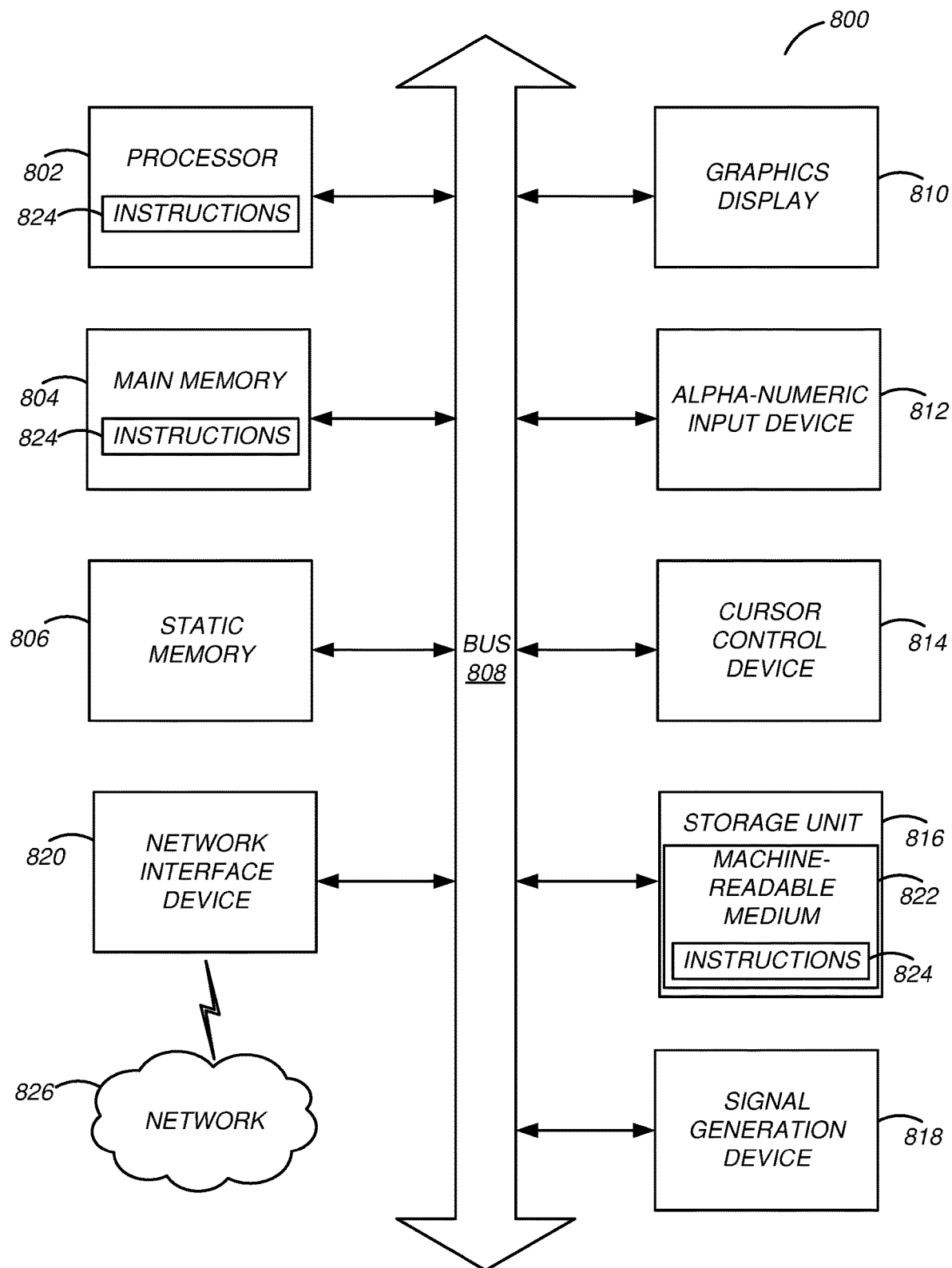
FIG. 8 illustrates components of an example machine able to read instructions from a machine-readable medium and execute them in a processor (or controller).

Turning now to FIG. 8, it is a block diagram illustrating components of an example machine able to read instructions from a machine-readable medium and execute them in a processor (or controller). Specifically, FIG. 8 shows a diagrammatic representation of a machine in the example form of a computer system 800 within which instructions 824 (e.g., as software or program code) for causing the machine to perform (execute) any one or more of the methodologies described with FIGS. 1-7. That is, the methodologies illustrated and described through FIGS. 1-7 can be embodied as instructions 824 that are stored and executable by the computer system 800. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The processing components are the processor 802 and memory 804. These components can be configured to operate the engines or modules with the instructions that correspond with the functionality of the respective engines or modules. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The storage unit 816 may be implemented as volatile memory (static RAM (SRAM) or dynamic RAM (DRAM)) and/or non-volatile memory (read-only memory (ROM), flash memory, magnetic computer storage devices (e.g., hard disks, floppy discs and magnetic tape), optical discs and etc.). The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

It is noted that although the configurations as disclosed are in the context of training models for clause identification, the principles disclosed can apply to the generation and training of other types of models using data from a plurality of different parties. Advantages of the disclosed configurations the ability of each party to provide information for generating and training the model, allowing the model to be able to be trained using a more diverse set of information, with each party having the ability to tracking where their submitted information is used, and to remove their information from the model. Moreover, while the examples herein are in the context of clause identification for a contract document, the principles described herein can apply to other documents, for example web pages, having various clauses.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, engines, modules, or mechanisms, for example, as illustrated in FIGS. 1-7. Modules may constitute either software modules (e.g., program code embodied as instructions 824 stored on a machine-readable medium e.g., memory 804 and/or storage unit 816, and executable by one or more processors (e.g., processor 802)) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors (generally, e.g., processor 802)) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 804). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for managing and tracking information for generating and training models through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method, comprising:
   receiving data from devices associated with a plurality of defined entities;
   storing the received data on a file system;
   recording, on a distributed ledger, one or more records, a first record of the one or more records comprising:
   an identifier corresponding to at least a portion of the received data on the file system; and
   an identifier corresponding to a first defined entity of the plurality of defined entities from which the at least a portion of the received data was received;
   identifying a set of data to be used for training the distributed machine learning model by traversing the one or more records of the distributed ledger and identifying the data from the plurality of defined entities stored on the file system using the traversed records; and
   training the distributed machine learning model using the identified set of data.

2. The method of claim 1, wherein the distributed machine learning model is configured to evaluate data corresponding to a set of clauses by generating, for each clause, a prediction of whether the clause is of a particular category.

3. The computer-implemented method of claim 1, further comprising:
   storing the trained distributed machine learning model in the file system;
   recording on the distributed ledger a second record comprising at least an identifier corresponding to the trained distributed machine learning model on the file system.

4. The computer-implemented method of claim 1, further comprising:
   receiving a request from a device of the first defined entity of the plurality of defined entities to delete data on the file system previously received from the first defined entity;
   deleting the requested data from the file system;

recording on the distributed ledger at least one record comprising:
an identifier corresponding to the deleted data;
an identifier corresponding to the first defined entity; and
training an updated distributed machine-learning model based upon a remaining portion of the received data on the file system.

5. The computer-implemented method of claim 4, further comprising identifying the requested data to be deleted by:
traversing the distributed ledger to identify at least one previously recorded record comprising an identifier corresponding to at least a portion of the requested data to be deleted; and
identifying the corresponding data on the file system.

6. The computer-implemented method of claim 1, further comprising replacing at least a portion of the data from the plurality of third defined entities with pseudo-random code, wherein the pseudo-random code is generated based at least in part upon a timestamp indicating the time at which a record of the plurality of records corresponding to the portion of data is generated.

7. The computer-implemented method of claim 1, wherein the data received from each device of each respective defined entity of the plurality of defined entities comprises a machine-trained model, wherein the machine-trained model received from each defined entity is trained based upon a set of underlying data examples provided by the defined entity, and wherein the distributed machine learning model comprises an ensemble model trained based upon a plurality of machine-trained models received from the plurality of defined entities.

8. The computer-implemented method of claim 1, wherein the received data comprises encrypted data, and further comprising:
identifying, based upon the identifier of the first record corresponding to the first defined entity, an encryption key associated with the first defined entity, and
decrypting the received data received from the first defined entity using the identified encryption key.

9. The computer-implemented method of claim 1, wherein the distributed ledger is accessible to a device associated with each defined entity of the plurality of defined entities for determining which defined entities have contributed data towards the training of the distributed machine learning model.

10. The computer-implemented method of claim 1, wherein the distributed ledger is a blockchain.

11. A system, comprising:
a file system configured to store data received from devices associated with a plurality of defined entities;
a transceiver module in communication with a distributed ledger, and configured to:
identify, on the distributed ledger, one or more records, a first record of the one or more records comprising:
an identifier corresponding to at least a portion of the received data on the file system; and
an identifier corresponding to a first defined entity of the plurality of defined entities from which the at least a portion of the received data was received;
a learning platform configured to:
identify a set of data to be used for training a distributed machine learning model by traversing the one or more records of the distributed ledger and identifying the data from the plurality of defined entities stored on the file system using the traversed records; and
generate and train a distributed machine learning model using the identified set of data.

12. The system of claim 11, wherein the learning platform is further configured to:
store the trained distributed machine learning model in the file system; and
record on the distributed ledger a second record comprising at least an identifier corresponding to the trained distributed machine learning model on the file system.

13. The system of claim 11, wherein the distributed machine learning model is configured to evaluate data corresponding to a set of clauses by generating, for each clause, a prediction of whether the clause is of a particular category.

14. The system of claim 12, wherein the learning platform is further configured to, in response to receiving a request from a device of the first defined entity of the plurality of defined entities to delete data on the file system previously received from the first defined entity:
delete the requested data from the file system;
record on the distributed ledger at least one record comprising:
an identifier corresponding to the deleted data;
an identifier corresponding to the first defined entity; and
train an updated distributed machine-learning model based upon a remaining portion of the received data on the file system.

15. The system of claim 11, wherein the data received from each device of each respective defined entity of the plurality of defined entities comprises a machine-trained model, wherein the machine-trained model received from each defined entity is trained based upon a set of underlying data examples provided by the defined entity.

16. The system of claim 11, wherein the received data comprises encrypted data, and wherein the learning platform is further configured to:
identify, based upon the identifier of the first record corresponding to the first defined entity, an encryption key associated with the first defined entity, and
decrypt the received data received from the first defined entity using the identified encryption key.

17. A method, comprising:
receiving a plurality of machine-trained models each associated with a defined entity, wherein the machine-trained model associated with a first defined entity is trained based upon a set of data provided by the first defined entity;
storing the received models on a file system;
recording on a distributed ledger one or more records, a first record of the one or more records comprising:
an identifier corresponding to a first model stored on the file system corresponding to the first defined entity; and
an identifier corresponding to the first defined entity;
identifying a set of models to be used for training an ensemble machine learning model by traversing the one or more records of the distributed ledger and identifying models stored on the file system corresponding to identifiers of the traversed records; and
training the ensemble machine learning model using the identified models.

18. The method of claim 17, further comprising:
storing the trained ensemble learning model in the file system;
recording on the distributed ledger an additional record comprising at least an identifier corresponding to the trained ensemble learning model on the file system.

19. The method of claim 17, further comprising:
receiving a request from a device associated with the first defined entity to delete the first model from the file system previously received from the first defined entity;
deleting the first model from the file system;
recording on the distributed ledger at least one record comprising:
an identifier corresponding to the deleted first model;
an identifier corresponding to the first defined entity; and
training an updated ensemble learning model based upon one or more remaining machine-trained models on the file system.

20. The method of claim 17, wherein the distributed ledger is accessible by a device associated with each defined entity for determining which defined entities have contributed machine-trained models towards the training of the ensemble machine learning model.

* * * * *